United States Patent
Petrov

(10) Patent No.: US 8,527,348 B2
(45) Date of Patent: *Sep. 3, 2013

(54) SHORT-RANGE COMMUNICATION ENABLED LOCATION SERVICE

(75) Inventor: Tsvetomir Petrov Petrov, Menlo Park, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/250,791

(22) Filed: Sep. 30, 2011

(65) Prior Publication Data

US 2012/0290396 A1    Nov. 15, 2012

Related U.S. Application Data

(63) Continuation of application No. 13/174,947, filed on Jul. 1, 2011.

(60) Provisional application No. 61/484,076, filed on May 9, 2011.

(51) Int. Cl.
*G06Q 30/00*    (2012.01)

(52) U.S. Cl.
USPC ..................................................... 705/14.64

(58) Field of Classification Search
USPC ........................................................ 705/14
See application file for complete search history.

(56) References Cited

U.S. PATENT DOCUMENTS

| | | | |
|---|---|---|---|
| 6,000,610 A * | 12/1999 | Talbott et al. | 235/383 |
| 6,587,835 B1 * | 7/2003 | Treyz et al. | 705/14.64 |
| 6,603,977 B1 | 8/2003 | Walsh et al. | |
| 6,604,681 B1 * | 8/2003 | Burke et al. | 235/383 |
| 6,757,999 B2 * | 7/2004 | Jurgens et al. | 40/299.01 |
| 6,912,507 B1 * | 6/2005 | Phillips et al. | 705/7.13 |
| 7,146,243 B2 | 12/2006 | Glynn | |
| 7,292,678 B2 | 11/2007 | Glynn et al. | |

(Continued)

FOREIGN PATENT DOCUMENTS

WO    2009017682 A1    2/2009

OTHER PUBLICATIONS

Emigh, "Droids, iPhones, and RFID to drive new mobile shopping and transit apps in 2010," betanews.com, published Jan. 14, 2010 [online]. Retrieved on Jan. 20, 2011. Retrieved from the Internet: <http://www.betanews.com/article/Droids-iPhones-and-RFID-to-drive-new-mobile-shopping-and-transit-apps-in-2010/1263497216> 3 pps.

(Continued)

*Primary Examiner* — Matthew L Hamilton
(74) *Attorney, Agent, or Firm* — Shumaker & Sieffert, P.A.

(57) ABSTRACT

In some examples, aspects of the present disclosure may include techniques to identify a physical location of an item with potentially enhanced precision. In one example, a method includes, receiving an item descriptor that describes one or more physical items. The method also includes receiving a data payload from a peripheral device using short-range wireless communication that includes information usable to locate at least one of the one or more physical items. The further includes selecting physical location data based on the item descriptor and the data payload, wherein the physical location data includes a representation of a physical location of the at least one of the one or more physical items; and outputting the physical location data that is usable to locate the at least one of the one or more physical items.

20 Claims, 5 Drawing Sheets

(56) References Cited

U.S. PATENT DOCUMENTS

| | | | |
|---|---|---|---|
| 7,791,471 | B2 | 9/2010 | Glynn et al. |
| 2002/0069131 | A1* | 6/2002 | Miyata et al. .................... 705/26 |
| 2002/0084323 | A1* | 7/2002 | Benyak .......................... 235/383 |
| 2002/0178013 | A1* | 11/2002 | Hoffman et al. ................... 705/1 |
| 2003/0126150 | A1 | 7/2003 | Chan |
| 2004/0103031 | A1* | 5/2004 | Weinschenk ..................... 705/14 |
| 2005/0044011 | A1* | 2/2005 | Deal ............................... 705/27 |
| 2005/0075118 | A1 | 4/2005 | Lewis et al. |
| 2005/0125386 | A1* | 6/2005 | Diebold ............................ 707/3 |
| 2005/0149414 | A1* | 7/2005 | Schrodt et al. ................... 705/29 |
| 2005/0256781 | A1* | 11/2005 | Sands et al. ...................... 705/26 |
| 2006/0059049 | A1* | 3/2006 | Morris et al. .................... 705/26 |
| 2006/0092072 | A1* | 5/2006 | Steiner ............................ 342/46 |
| 2006/0283941 | A1* | 12/2006 | Singer-Harter ................ 235/383 |
| 2007/0191026 | A1* | 8/2007 | Teplitsky ................... 455/456.3 |
| 2007/0197229 | A1 | 8/2007 | Kalliola et al. |
| 2007/0250707 | A1 | 10/2007 | Noguchi |
| 2007/0254674 | A1 | 11/2007 | Pedigo et al. |
| 2008/0139114 | A1 | 6/2008 | Ranganathan |
| 2008/0143482 | A1* | 6/2008 | Shoarinejad et al. ......... 340/10.1 |
| 2008/0198001 | A1* | 8/2008 | Sarma et al. ............... 340/539.1 |
| 2008/0243626 | A1* | 10/2008 | Stawar et al. .................... 705/23 |
| 2008/0270249 | A1* | 10/2008 | Rosenbaum et al. ........... 705/26 |
| 2008/0301102 | A1* | 12/2008 | Liang ................................ 707/3 |
| 2009/0012704 | A1* | 1/2009 | Franco et al. .................. 701/200 |
| 2009/0125394 | A1* | 5/2009 | Otto et al. ........................ 705/14 |
| 2009/0170483 | A1* | 7/2009 | Barnett et al. ............. 455/414.2 |
| 2009/0287587 | A1* | 11/2009 | Bloebaum et al. .............. 705/27 |
| 2009/0298426 | A1 | 12/2009 | Helvick |
| 2010/0010964 | A1* | 1/2010 | Skowronek et al. ............... 707/3 |
| 2010/0106602 | A1* | 4/2010 | Fuzell-Casey et al. .... 705/14.58 |
| 2010/0106662 | A1* | 4/2010 | Ramaswamy ................ 705/323 |
| 2010/0179889 | A1* | 7/2010 | Johnsmeyer et al. ........... 705/26 |
| 2010/0318412 | A1* | 12/2010 | Karypis et al. ................. 705/14.1 |
| 2011/0106635 | A1* | 5/2011 | Khan et al. ................. 705/14.73 |
| 2011/0251920 | A1* | 10/2011 | Watson ........................ 705/26.9 |
| 2011/0264520 | A1* | 10/2011 | Puhakka .................... 705/14.49 |
| 2012/0030227 | A1* | 2/2012 | Mital et al. .................... 707/767 |
| 2012/0095805 | A1* | 4/2012 | Ghosh et al. ................. 705/7.34 |
| 2012/0123674 | A1* | 5/2012 | Perks et al. .................... 701/426 |

OTHER PUBLICATIONS

"Are you ready for Multi-channel 2.0? Understand and harness the power of new commerce channels," [online]. elasticpath™, Elastic Path Software Inc., Vancouver, BC, Canada. Retrieved on Jan. 20, 2011. Retrieved from the internet: <http://www.elasticpath.com/pdf/resources/white-papers/Elastic_Path_Multichannel2.pdf> Title page, Table of Contents, and pp. 3-19 (19 pps.).

Ziegler, "Meijer deploys indoor positioning trial, helps you find the Morton Salt faster," engadget.com [online] posted Aug. 25, 2010. Retrieved on Jan. 20, 2011. Retrieved from the Internet: <http://www.engadget.com/2010/08/25/meijer-deploys-indoor-positioning-trial-helps-you-find-the-mort/> 6 pps.

Weichert, et al. "Near Field Communication Use in Retail Stores: Effects on the Customer Shopping Process," Mobile und Ubiquitäre Informationssysteme—Entwicklung, Implementierung und Anwendung (proceedings) [online]. Retrieved on Jan. 20, 2011. Retrieved from the internet: <http://subs.emis.de/LNI/Proceedings/Proceedings146/gi-proc-146-010.pdf> 5 pps.

Paasovaara, et al., "Charting User Expectations on Mobile Shopping—Role-playing Study on Mobile Interaction with RFID Technology," pervasive2008.org [online]. Retrieved on Jan. 20, 2011. Retrieved from the internet: <http://www.pervasive2008.org/Papers/Workshop/w4-05.pdf> 4 pps.

Ankeny, "Retail Industry-First: Shoppers Can Precisely Locate Items In-Store on their Phones with Meijer's Free 'Find-it' App," published on FierceMobileContent [online]. Created Aug. 25, 2010. Retrieved on Jan. 20, 2011. Retrieved from the internet:<http://www.fiercemobilecontent.com/press-releases/retail-industry-first-shoppers-can-precisely-locate-items-store-their-phones-meijers-> 2 pps.

U.S. Appl. No. 13/174,947, by Tsvetomir Petrov Petrov, filed Jul. 1, 2011.

International Search Report and Written Opinion of international application No. PCT/US2012/036958, dated Jul. 25, 2012, 12 pp.

Yao Ching-Bang, "Personalized guidance and ubiquitous learning in intelligent library with multi-agent," Computer and Automation Engineering (ICCA), 2010 The 2nd International Conference on, IEEE, Piscataway, NJ, USA Feb. 26, 2010, pp. 578-582.

Non-Final Office Action from U.S. Appl. No. 13/174,947, dated Feb. 1, 2013, 34 pp.

Responsive amendment, dated Jul. 1, 2013, for U.S. Appl. No 13/174,947, 12 pages.

* cited by examiner

SHORT-RANGE COMMUNICATION ENABLED LOCATION SERVICE

RELATED APPLICATIONS

This application is a continuation of U.S. patent application Ser. No. 13/174,947, filed Jul. 1, 2011, which claims the benefit of U.S. Provisional Application No. 61/484,076, filed May 9, 2011, the entire contents of each of which are incorporated herein in its entirety.

TECHNICAL FIELD

This disclosure relates to electronic devices and, more specifically, to short-range communication of electronic devices.

BACKGROUND

A user may interact with applications executing on a computing device (e.g., mobile phone, tablet computer, smart phone, or the like). For instance, a user may install, view, or delete an application on a computing device.

In some instances, a user may interact with the computing device through a graphical user interface. In some examples, the computing device may include a short-range communication device. An application executing on the computing device may access the short-range communication device.

SUMMARY

In one example, a method includes receiving, by a mobile computing device, an item descriptor that describes one or more physical items. The method also includes receiving, by the mobile computing device from a peripheral device using short-range wireless communication, a data payload comprising information usable to locate at least one of the one or more physical items. The method further includes selecting, by the mobile computing device, location data based on the item descriptor and the data payload, wherein the physical location data includes a representation of a physical location of the at least one of the one or more physical items; and outputting, from an output device of the mobile computing device the physical location data that is usable to locate the at least one of the one or more physical items.

In one example, a computer-readable storage medium is encoded with instructions that, when executed, cause one or more processors of a computing device to perform operations including: receiving, by a mobile computing device, an item descriptor that describes one or more physical items. The a computer-readable storage is further encoded with instructions that, when executed, cause one or more processors of a computing device to perform operations including receiving, by the mobile computing device and from a peripheral device using short-range wireless communication, a data payload comprising information usable to locate at least one of the one or more physical items. The a computer-readable storage is also encoded with instructions that, when executed, cause one or more processors of a computing device to perform operations including selecting, by the mobile computing device, physical location data based on the item descriptor and the data payload, wherein the physical location data includes a representation of a physical location of the at least one of the one or more physical items; and outputting, from an output device of the mobile computing device, the physical location data that is usable to locate the at least one of the one or more physical items.

In one example, a computing device includes: one or more processors. The computing device further includes an input device to receive an item descriptor that describes one or more physical items. The computing device also includes a short-range communication device to receive a data payload provided by a peripheral device using short-range wireless communication comprising information usable to locate at least one of the one or more physical items. The computing device further includes means for selecting physical location data based on the item descriptor and the data payload, wherein the physical location data includes a representation of a physical location of the at least one of the one or more physical items. The computing device also includes an output device to output the physical location data that is usable to locate the at least one of the one or more physical items.

The details of one or more examples of this disclosure are set forth in the accompanying drawings and the description below. Other features, objects, and advantages of the disclosure will be apparent from the description and drawings, and from the claims.

DETAILED DESCRIPTION

In general, aspects of the present disclosure are directed to techniques to identify a physical location of an item. As one example, in various environments, a customer may be overwhelmed by large floor plans and extensive arrangements of physical items. Common examples of such environments include libraries, malls, and superstores. In such environments, a user may be required to exert substantial effort to locate an item, which may increase the amount of time expended in a shopping experience or similar activity.

In some examples, a computing device may be equipped with a short-range wireless communication transmitter. Short-range wireless communication may include Near-Field Communication (NFC) and Bluetooth, to name a few examples. The short-range communication transmitter may, in some examples, read data from peripheral devices. A peripheral device may include a Radio-Frequency Identification (RFID) tag, NFC tag or other similar short-range communication devices. Data from such a peripheral device may include information that may be used to locate one or more items that are in physical proximity to the peripheral device. The data from the peripheral device may be received by the computing device, e.g., via NFC, and processed by a module executing on the computing device. In one example, the module may generate information to physically locate the one or more items.

Figure 1:
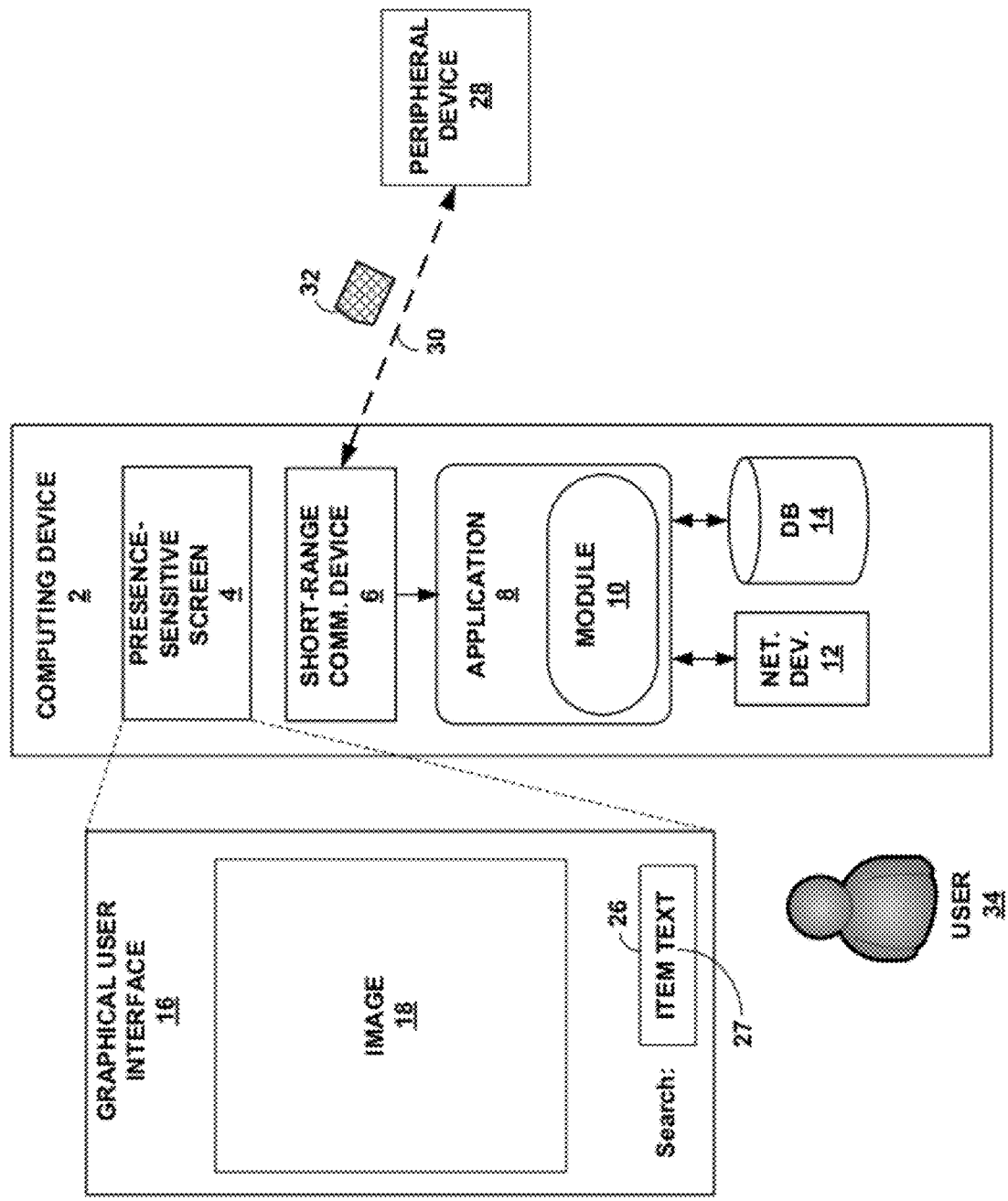
FIG. 1 is a diagram illustrating an example of a computing device that may be configured to execute an application in accordance with one or more aspects of the present disclosure.

FIG. 1 is a diagram illustrating an example of a computing device 2 that may be configured to execute an application 8 in accordance with one or more aspects of the present disclosure. Computing device 2, in some examples, includes or is a part of a portable computing device (e.g. mobile phone/netbook/laptop/tablet device) or a desktop computer. Computing device 2 may also connect to a network including a wired or wireless network using a network device 12.

In some examples, computing device 2 includes a short-range communication device 6. In one example, short-range communication device 6 is capable of short-range wireless communication 30 using a protocol such as Bluetooth or Near-Field Communication. Short-range wireless communication 30, in some examples, includes wireless communications between computing device 2 and peripheral device 28 of approximately 100 meters or less. In some examples, a person and/or computing device may manually or automatically update information usable to locate an item on peripheral device 28 when peripheral device 28 is a programmable device.

Short-range wireless communication 30, in some examples, includes two different modes of operation. For example, short-range wireless communication 30 may include an active mode and a passive mode of operation. In an active mode of operation, computing device 2 may generate a first radio field that is received by peripheral device 28 in physical proximity to computing device 2. In response, peripheral device 28 may generate a second radio field that is received by short-range communication device 6. In this way, data may be communicated between computing device 2 and peripheral device 28.

In a passive mode of operation, load modulation techniques may be employed to facilitate data communication between computing device 2 and peripheral device 28. In a passive mode, peripheral device 28 does not generate a radio field in response to the radio field of short range communication device 6. Instead, peripheral device 28 may include electrical hardware that generates a change in impedance in response to a radio field. For example, short-range communication device 6 may generate a radio field that is received by peripheral device 28. Electrical hardware in peripheral device 28 may generate a change in impedance in response to the radio field. The change in impedance may be detected by short-range communication device 6. In this way, load modulation techniques may be used by computing device 2 to receive information from peripheral device 28. Other well-known modulation techniques including phase modulation and/or amplitude modulation may also be employed to facilitate data communication between computing device 2 and peripheral device 28.

In one example, peripheral device 28 may be another computing device similar to computing device 2. For example, peripheral device 28, in some examples, may include or be a part of a portable computing device (e.g. mobile phone/netbook/laptop/tablet device) or a desktop computer. In other examples, peripheral device 28 may include electrical hardware that generates a change in impedance in response to a radio field. In some examples, peripheral device 28 may be a tag that includes electrical hardware, which generates a change in impedance in response to a radio field. In some examples, peripheral device 28 may include a tag that may be attached to an object.

In one example, computing device 2 may receive a data payload 32 from peripheral device 28 in response to receiving a radio field generated by short-range communication device 6. In some examples, data payload 32 may include data that is stored and/or generated by peripheral device 28. In some examples, data payload 32 may include a unique identifier. In one example, a unique identifier may include data such as a serial number or other data that uniquely identifies peripheral device 28. For example, where two or more peripheral devices are present, each peripheral device may be uniquely identified by a unique identifier. In some examples, data payload 32 may include any information usable to locate one or more physical items.

In one example, short-range communication device 6 may receive data payload 32 from peripheral device 28. Application 8, in turn, may receive data payload 32 from short-range communication device 6. In some examples, application 8 may include data and instructions executing on computing device 2. Application 8 may include a module 10, which may perform various functions of application 8 described herein. Application 8, in some examples, may store and retrieve information stored in database 14. In some examples, information may include physical location data. Physical location data may include, for example, a representation of a physical location to locate one or more physical items. In some examples, a representation of a physical location may be a picture, sound, animation, or other human-interpretable form of information.

In some examples, application 8 may communicate with network device 12. For example, application 8 may communicate with one or more remote computing devices via a network (see e.g., FIG. 4). In other examples, application 8 may communicate with other applications executing on computing device 2 using well-known inter-process communication techniques including, e.g., shared memory, messages, sockets, and/or pipes. Inter-process communication techniques are described for example purposes only and other forms of communication are also contemplated.

Computing device 2, in some examples, includes one or more input devices. In some examples, an input device may be a presence-sensitive screen 4. Presence-sensitive screen 4, in one example, generates one or more signals corresponding to a location selected by a gesture performed on or near the presence-sensitive screen 4. In some examples, presence-sensitive screen 4 detects a presence of an input unit, e.g., a finger that is in close proximity to, but does not physically touch, presence-sensitive screen 4. In other examples, the gesture may be a physical touch of presence-sensitive screen 4 to select the corresponding location, e.g., in the case of a touch-sensitive screen. Presence-sensitive screen 4, in some examples, generates a signal corresponding to the location of the input unit. Signals generated by the selection of the corresponding location are then provided as data to applications and other components of computing device 2. In some examples, presence-sensitive screen 4 may display a graphical keyboard that may enable a user to enter one or more input values, e.g., characters.

In some examples, computing device 2 includes an output device, e.g., presence-sensitive screen 4. In some examples, presence-sensitive screen 4 may be programmed by computing device 2 to display graphical content. Graphical content, generally, includes any visual depiction displayed by presence-sensitive screen 4. Examples of graphical content may include images, text, videos, and/or other visual program components such as scroll bars, text boxes, buttons, etc. As shown in FIG. 1, GUI 16 may include image 18. In one example, application 8 may cause presence-sensitive screen 4 to display graphical user interface (GUI) 16.

As shown in FIG. 1, application 8 may execute on computing device 2. Application 8 may include program instructions and/or data that may be executable by computing device 2. Examples of application 8 may include a web browser, email application, text messaging application or any other application that receives user input and/or displays graphical content.

In some examples, application 8 causes GUI 16 to be displayed in presence-sensitive screen 4. GUI 16 may include interactive and/or non-interactive graphical content that presents information of computing device 2 in human-readable form. In some examples GUI 16 enables a user to interact with application 8 through presence-sensitive screen 4. For example, a user may perform a gesture at a location of presence-sensitive screen 4 that provides an input value. In response to receiving the gesture, an operation associated may be executed by computing device 2. In this way, GUI 16 enables a user to create, modify, and/or delete data of computing device 2.

As previously described herein, in certain instances, an individual may potentially be overwhelmed by large floor plans and extensive arrangements of physical items in some environments. Common examples of such environments include libraries, malls, and retail stores. Often, many different items are arranged closely together to maximize physical storage space, e.g., many books arranged closely together in a library. Consequently, in some examples, although an individual may have information that indicates a general approximation of a desired item's physical location, the individual may spend substantial time searching for the precise location of the desired item. Thus, in some examples, the availability of imprecise physical location information may not improve an individual's ability to quickly locate a desired item. In other examples, imprecise physical location information may be inaccurate with respect to one's current position relative to a desired item. In still other examples, a detailed map of every item may convey too much information to an individual, thereby rendering such a map impractical for use by the individual.

Aspects of the present disclosure may use short-range communication to provide location-based services based on location information provided using the short-range communication. For example, a peripheral device may be in physical proximity to an item desired by a user. Using short-range communication, an application executing on a user's mobile computing device may receive information from the peripheral device to locate the desired physical item. The information contained in the peripheral device may include high-precision location information of the peripheral device location, e.g., physical orientation of the peripheral device, spatial location coordinates of the peripheral device, etc. Such high-precision location information may be used by an application executing on the user's mobile computing device to generate a representation of a physical location of the desired item. In such examples, a user may quickly identify the desired item using the representation of a physical location of the desired item. Aspects of the present disclosure thus, in some examples, employ short-range communication to retrieve high-precision location information, which may be used to locate one or more desired items efficiently and with minimal user effort.

As shown in FIG. 1, application 8 may include GUI 16 displayed by presence-sensitive screen 4. In some examples, GUI 16 may include image 18. For example, as shown in FIG. 1, image 18 may include a map of a superstore that illustrates various aisles of the superstore. GUI 16 may further include a text field 26. Text field 26 may enable user 34 to input various input values. For example, as shown in FIG. 1, user 34 may input text 27 indicating the name of an item. In one example the name of an item may be the word "Aspirin." In this way, application 8 may receive input values via GUI 16.

In some examples, a user may wish to locate an item, e.g., a bottle of aspirin, in a large superstore. Aspects of the present disclosure may enable user 34 to locate the item quickly and efficiently, using high-precision location information. In FIG. 1, user 34 may execute application 8 on computing device 2. Application 8 may cause GUI 16 to be displayed by presence-sensitive screen 4. Initially, GUI 16 may include only text field 26. Using presence-sensitive screen 4, user 34 may enter text 27 into text field 26. In some examples, text 27 may be an item descriptor. An item descriptor, in some examples, may be a description of an item sought by the user 34, e.g., the name of an item. For example, an item descriptor may be a string that comprises one or more characters or words describing the item. In other examples, an item descriptor may be a hash code, serial number or other unique identifier. In any case, an item descriptor may describe or identify one or more items. In some examples, an item may be a physical object or physical location. For example, an item may be a bottle of aspirin.

User 34 may provide an item descriptor to application 8 using numerous different techniques. In one example, user 34 may type one or more characters that include an item descriptor using a keyboard of computing device 2. In other examples, computing device 2 may include a microphone, e.g., an input device, which may receive an audio signal such as a voice audio signal provided by user 34. User 34 may, for example, speak one or more words or sounds that describe one or more physical items. Module 10 may receive the audio signal from a microphone of computing device 2. Module 10 may perform an audio-to-text operation that converts the audio signal to data that represents the one or more physical items. In some examples, module 10 may determine that an item descriptor includes the data representing the one or more physical items. In this way, user 34 may efficiently input item descriptors using audio-to-text techniques. For examples of such techniques see, e.g., Plannerer, B., An Introduction to Speech Recognition (March 2005); Stolcke, A., et al., Recent Innovations in Speech-to-Text Transcription at SRI-ICSI-UW (September 2006); Lawrence Rabiner & Ronald Schafer, Theory and Applications of Digital Speech Processing (2010).

In the current example, user 34 may search for the desired item in a superstore. In one example, the superstore may include one or more aisles, which include one or more items. Furthermore, the superstore may include one or more peripheral devices, e.g., peripheral device 28, positioned at various locations in the superstore. Peripheral device 28, as shown in FIG. 1, may be a NFC peripheral device. Peripheral device 28 may include a data payload that includes information usable to locate a desired item. For example, as shown in FIG. 1, peripheral device 28 may include information to the desired item. In one example, data payload 32 of peripheral device 28 may include a unique identifier of peripheral device 28.

Continuing with the current example, user 34 may position computing device 2 in physical proximity to peripheral device 28. In one example, a physical proximity may indicate a distance of approximately 0-100 meters between computing device 2 and peripheral device 28. In some examples, computing device 2 may use short-range communication device 6 to communicate via short-range wireless communication 30 with peripheral device 28. In the current example, computing device 2 may receive data payload 32 from peripheral device 28 via near-field communication.

Application 8 may receive data payload 32 from peripheral device 28 in the current example. As previously described, data payload 32 may include information usable to locate a desired item. In some examples, module 10 may use data payload 32 to perform a search operation that may select physical location data based on an item descriptor and data payload. For example, module 10 may determine, in the current example, that data payload 32 includes a unique identifier of peripheral device 28. As shown in the current example, module 10 may use data payload 32 and text 27 to query database 14 in order to select physical location data associated with item 29. In some examples, physical location data may include a representation of a physical location to locate item 29.

As shown in FIG. 1, computing device 2 may include a database 14. Database 14, in some examples, may include one or more unique identifiers of peripheral devices. For example, database 14 may include a unique identifier of peripheral device 28. Each unique identifier may, for example, be associated with physical location data. In some examples, physical location data may include a representation of a physical location to locate an item. For example, physical location data may include spatial coordinates and/or orientation of the peripheral device. In some examples, physical location data may include two- and/or three-dimensional maps. For example, image 18 of FIG. 1 may be a map. In some examples, module 10 may select a unique identifier from data payload 32, which may be used by module 10 to select physical location data, e.g., a map, from database 14.

In the current example, application 8 may cause presence-sensitive screen 4 to output image 18 that includes a map of the superstore in response selecting physical location data based on text 27 (e.g., an item descriptor) and data payload 32. In one example, the map of image 18 may be presented from a perspective of a person at the location of the peripheral device. For example, GUI 16 may display the map of image 18 from the perspective of user 34 facing a shelf to which peripheral device 28 is attached. Thus, in the current example, image 18 may include a physical item indicator that indicates a physical location of the desired item in the aisle. Consequently, image 18 may provide user 34 with high-precision location information to quickly and efficiently identify the physical location of a desired item. Although peripheral device 28 is described as attached to the shelf in the current example, peripheral device 28 may, more generally, be located in physical proximity to the shelf.

As described in the current example, computing device 2 may receive data payload 32 that includes information usable to locate an item. Information usable to locate an item may include any information that may be used by module 10 of computing device 2 to select physical location data. This information may, in some examples, be stored on peripheral device 28. In the current example, such information may include a unique identifier of peripheral device 28. In some examples, information usable to locate an item may include spatial coordinates and/or orientation of the peripheral device. In still other examples, such information may include a Uniform Resource Locator (URL) that identifies a resource which may include physical location data. In other examples, information usable to locate an item may include physical location data.

In some examples, physical location data may include any data that indicates a physical location of an item. For example, physical location data may include any audio data or visual data. In one example, physical location data may include two- and/or three-dimensional maps. In other examples, physical location data may include audio data that provides audio instructions to locate a desired item. For example, an audio instruction may include instructions that indicate a distance of a user to the desired item. An audio instruction may, in some examples, indicate one or more landmarks or reference objects in proximity to the desired item that a user may recognize. In similar examples, physical location data may include video data that provides video instructions to a desired item.

For example, a video instruction may include an animation that indicates a route to the desired item and in some examples an item indicator to visually indicate the item location. In one example, a video instruction may present user 34 with a route that user 34 may travel via to obtain a desired item. In still other examples, physical location data may include one or more pictures, e.g., drawings, photographs, or other still-frame visual representations. A picture may, in one example, indicate one or more landmarks or reference objects in proximity to the desired item that a user may recognize. For example, a picture may indicate a photograph of a shelf as viewed when facing peripheral device 28. The photograph may further include an item indicator, e.g., a star shape icon that may indicate a physical location of the desired item.

As shown in FIG. 1, computing device 2 may be configured to select physical location data based on an item descriptor and a data payload that includes information usable to locate an item. In a first example scenario, peripheral device 28 may include physical location data, e.g., a map of aisle and shelves. Computing device 2 may initially receive item descriptor, e.g., text 27 from user 34. Computing device 2 may receive data payload 32 which may include image 18 and a unique identifier of peripheral device 29. Module 10 may select image 18 and further display an item indicator that corresponds to the physical location of the desired item sought by user 34. Application 8 may cause presence-sensitive screen 4 to display image 18, which includes the map and item indicator of image 18.

In a second example scenario, peripheral device 28 may include only a unique identifier. Physical location data such as image 18 that includes a map may be stored in database 14. In some examples, database 14 may execute on a remote server. In such examples, peripheral device 28 may query database 14 via a wired or wireless network connection to select physical location data. Module 10 may use text 27 (e.g., an item description) and data payload 32 that includes the unique identifier and to select image 18 from database 14. Module 10 may include means for selecting physical location data based on the item descriptor and the data payload. For example, module 10 may generate a search query that includes the item descriptor and the unique identifier. The search query may comprise a string or other data object that module 10 may use to query database 14. Database 14 may process the search query and generate search results that include physical location data, e.g., image 18. Module 10 may subsequently display image 18 as in the first example scenario. In the second example scenario, only a small amount of data, e.g., a unique identifier, may be stored on peripheral device 28. In contrast, a larger amount of data including physical location data may be stored on peripheral device 28 in the first example scenario. Thus, aspects of the current disclosure provide flexibility to store large or small amounts of data on peripheral device 28 and/or database 14 of computing device 2.

As shown in FIG. 1, database 14 may include physical location data. In some examples, user 34 may manually load information into database 14 prior to searching for item 29. For example, user 34, prior to going to a library, may load physical location data of the library into database 14. In other examples, user 34 may specify one or more settings to automatically store data in database 14. For example, user 34 may specify one or more resources, such as remote storage repositories, that include physical location data. Module 10 may use the one or more settings to automatically synchronize some or all physical location data of a remote storage repository with physical location data in database 14. In some examples, database 14 may be automatically synchronized in real-time with one or more remote storage repositories.

In some examples, module 10 may automatically synchronize data based on a physical location of computing device 2. Computing device 2 may, in one example, access a Global Positioning System using a GPS device included in computing device 2 to determine it is in proximity to a superstore. For example, module 10 may use physical location coordinates received from the Global Position System to query a map service or location directory that includes physical location coordinates of landmarks, stores, or other physical locations. Module 10 may determine a distance between computing 2 and other such physical locations using physical location coordinates. For example, module 10, upon determining computing device 2 is in proximity to a superstore, may automatically synchronize database 14 and the superstore remote storage repository. In other examples, computing device 2 may synchronize database 14 when a user causes computing device 2 and a peripheral device to communicate via short-range communication. For example, upon entering a superstore a user may initially scan a peripheral device. Computing device 2 may, in response to the initial scan, determine its physical location and automatically synchronize with a response storage repository. In still other examples, module 10, when performing a search operation may determine that requested physical location data is not included in database 14. Module 10, in such examples, may query remote storage repositories as further described in FIG. 4.

In one non-limiting example, a manager of a superstore may attach a NFC tag (e.g., a peripheral device) to the end of a shelf in an aisle. The NFC tag may include a unique identifier of NFC tag. The store manager may generate an inventory database that includes one or more associations between physical location data of a portion of the self that contains bottles of aspirin and a unique identifier. The store manager may further include the physical distance from the NFC tag to the physical location of the aspirin bottles in the aisle. For example, the aisle may include the bottles of aspirin, which may be located 25 feet directly straight ahead from the NFC tag. The orientation and distance relationship of the aspirin bottles and the NFC tag may also be stored in the inventory database. Consequently, the inventory database may include a precise location of the aspirin bottles on the shelf.

At a later time, a user may enter the superstore seeking a bottle of aspirin. The user may initially synchronize a database of computing device 2 with the inventory database upon entering the superstore. User 34 may then enter text, e.g., an item descriptor that indicates "ASPIRIN" in the computing device. Walking to the shelf that includes the aspiring bottles, user 34 may place his/her computing device 2 in physical proximity to the NFC tag to receive a data payload.

Upon receipt of the data payload, module 10 of computing device 2 may select the unique identifier of the peripheral device. Module 10 may use the unique identifier and the item descriptor to query database 14 which includes physical location data. Module 10 may select the distance and orientation data of aspirin 29 and a two-dimensional map from database 14. Module 10 may cause computing device 2 to display a map which may further include an item indicator that identifies the location of the aspirin bottles and a user location indicator that indicates the location of the user. Using this information, user 34 may locate an aspirin bottle by viewing the map on computing device 2 and walking 25 feet down aisle from the peripheral device.

Various aspects of the disclosure may provide location information to quickly identify one or more items. In such examples, an exact location of an item may be determined within a small margin of error, e.g., inches using short-range communication in conjunction with physical location data. Moreover, high-precision information generated according to an item descriptor may enable a computing device to generate physical location data targeted to relevant items rather than presenting all available physical location data.

Aspects of the present disclosure may also avoid limitations imposed by physical structures such as walls or ceilings. For example, Global Positioning System (GPS) enabled computing device may require unobstructed or partially obstructed paths from the computing device to one or more satellites. In many environments, walls, ceilings and other solid structures may make GPS enabled computing devices unsuitable due to the unavailability of satellite signals. Moreover, GPS systems may provide unacceptably large margins of error, e.g., 10-100 feet, between an exact location of an item and a location generated from GPS by a computing device. Similarly unacceptable margins of error may also be present in, e.g., triangulation techniques, which may implemented in wireless networks. In contrast, techniques of the present disclosure using short-range communication may provide enhanced precision location information having a margin of error of inches or less.

Aspects of the present disclosure also provide user-friendly physical location data that may be substantially more helpful to a user than a basic map. For example, video, picture, and audio based instructions may enable a user to identify with a high degree of precision, the exact location of an item. Thus, in one example, a photograph may illustrate an exact location of a book relative to other books in a bookshelf. In this way, a user may visually recognize the desired book using a visual context provided by the photograph.

The aforementioned potential benefits and advantages are exemplary and other such benefits and advantages may be apparent in the previously-described non-limiting examples. While some aspects of the present disclosure may provide all of the aforementioned exemplary benefits and advantages, no aspect of the present disclosure should be construed to necessarily require any or all of the aforementioned exemplary benefits and advantages.

Figure 2:
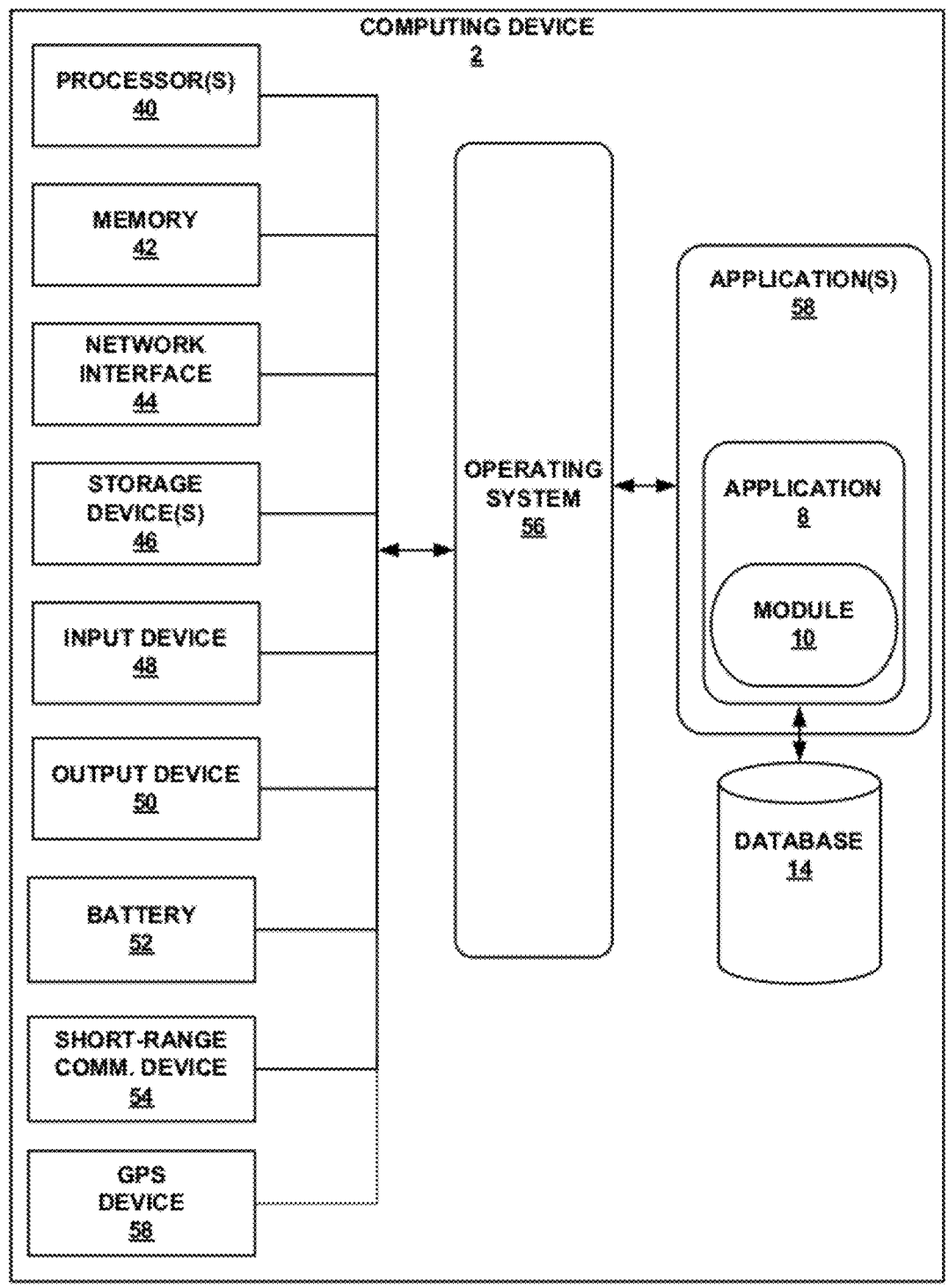
FIG. 2 is a diagram illustrating further details of one example of computing device 2 shown in FIG. 1, in accordance with one or more aspects of the present disclosure.

FIG. 2 is a diagram illustrating further details of one example of computing device 2 shown in FIG. 1, in accordance with one or more aspects of the present disclosure. FIG. 2 illustrates only one particular example of computing device 2, and many other example configurations of computing device 2 may be used in other instances.

As shown in the specific example of FIG. 2, computing device 2 includes one or more processors 40, memory 42, a network interface 44, one or more storage devices 46, input device 48, output device 50, battery 52, and short-range communication device 54. Computing device 2 also includes an operating system 56. Computing device 2, in one example, further includes application 8 and one or more other applications 58. Application 8 and one or more other applications 58 are also executable by computing device 2. Each of components 40, 42, 44, 46, 48, 50, 52, 54, 56, and 8 may be interconnected (physically, communicatively, and/or operatively) for inter-component communications.

Processors 40, in one example, are configured to implement functionality and/or process instructions for execution within computing device 2. For example, processors 40 may be capable of processing instructions stored in memory 42 or instructions stored on storage devices 46.

Memory 42, in one example, is configured to store information within computing device 2 during operation. Memory 42, in some examples, is described as a computer-readable storage medium. In some examples, memory 42 is a temporary memory, meaning that a primary purpose of memory 42 is not long-term storage. Memory 42, in some examples, is described as a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 42 is used to store program instructions for execution by processors 40. Memory 42, in one example, is used by software or applications running on computing device 2 (e.g., application 8 and/or one or more other applications 58) to temporarily store information during program execution.

Storage devices 46, in some examples, also include one or more computer-readable storage media. Storage devices 46 may be configured to store larger amounts of information than memory 42. Storage devices 46 may further be configured for long-term storage of information. In some examples, storage devices 46 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes a network interface 44. Computing device 2, in one example, utilizes network interface 44 to communicate with external devices via one or more networks, such as one or more wireless networks. Network interface 44 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 2 utilizes network interface 44 to wirelessly communicate with an external device (not shown) such as a server, mobile phone, or other networked computing device.

Computing device 2, in one example, also includes one or more input devices 48. Input device 48, in some examples, is configured to receive input from a user through tactile, audio, or video feedback. Examples of input device 48 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 50 may also be included in computing device 2. Output device 50, in some examples, is configured to provide output to a user using tactile, audio, or video stimuli. Examples of output device 50 include presence-sensitive screen of FIG. 1. Output device 50, in one example, includes a presence-sensitive screen, sound card, audio speaker, video graphics adapter card, video projector, or any other type of device for converting a signal into an appropriate form understandable to humans or machines. Additional examples of output device 50 include a cathode ray tube (CRT) monitor, a liquid crystal display (LCD), or any other type of device that can generate intelligible output to a user.

Computing device 2, in some examples, include one or more batteries 52, which may be rechargeable and provide power to computing device 2. Battery 52, in some examples, is made from nickel-cadmium, lithium-ion, or other suitable material.

Computing device 2, in some examples, includes one or more short-range communication devices 54. In some examples, short-range communication device 54 communicates wirelessly with other devices in physical proximity to short-range communication device 54, e.g., approximately 0-100 meters. In other examples, short-range communication device 54 reads a tag, e.g., an RFID tag, via a radio frequency signal. Some examples of short-range communication device 54 include a Bluetooth, Near-Field Communication, or Ultra-Wideband radio.

Computing device 2, in some examples, may include a Global Positioning System (GPS) device 58. In some examples, GPS device 58 may send and receive information from a global navigation satellite system. In some examples, GPS device 58 may receive one or more physical location coordinates from the global satellite system that indicates a position of computing device 2. Thus, in some examples, GPS device 58 may enable computing device 2 to determine its physical location based on the one or more physical location coordinates.

Computing device 2 may include operating system 56. Operating system 56, in some examples, controls the operation of components of computing device 2. For example, operating system 56, in one example, facilitates the interaction of application 8 with processors 40, memory 42, network interface 44, storage device 46, input device 48, output device 50, battery 52, and short-range communication device 54. Examples of operating system 56 may include Android, Apple iOS, Blackberry OS, Symbian OS, Linux, and Microsoft Windows Phone.

Computing device 2 may include a database 14. In some examples, database 14 may be a lookup table, map or other suitable data structure. In other examples, database 14 may include Relational Database Management System (RDBMS) software. In one example, database 14 may be a relational database and accessed using a Structured Query Language (SQL) interface that is well known in the art. Database 14 may alternatively be stored on a separate networked computing device and may be accessible via a network interface or system bus of computing device 2. Database 14 may in other examples be an Object Database Management System (ODBMS), Online Analytical Processing (OLAP) database or other suitable data management system.

As shown in FIG. 2, application 8 may include a module 10 as described in FIG. 1. Audio control module 10 may include program instructions and/or data that are executable by computing device 2. For example, module 10 may include instructions that cause application 8 executing on computing device 2 to perform one or more of the operations and actions described in FIGS. 1-5. In some examples, module 10 may be a part of operating system 56 executing on computing device 2. In some examples, module 10 may communicate with operating system 56 that receives input from one or more input devices 48 of computing device 2.

Any applications, e.g., application 8 or other applications 58, implemented within or executed by computing device 2 may be implemented or contained within, operable by, executed by, and/or be operatively/communicatively coupled to components of computing device 2, e.g., processors 40, memory 42, network interface 44, storage devices 46, input devices 48, output devices 50, batteries 52, and/or short-range communication device 54.

Figure 3:
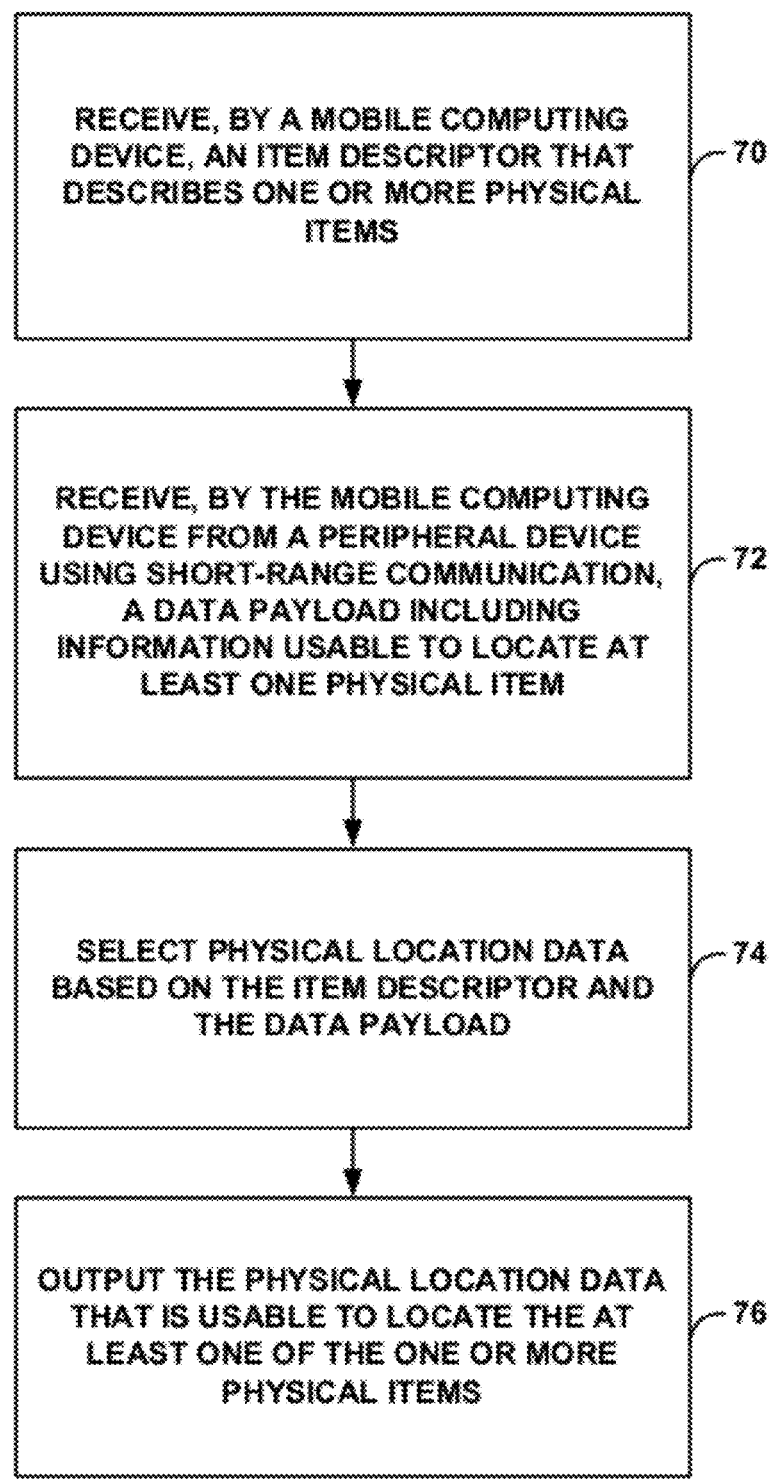
FIG. 3 is a flow diagram illustrating an example method that may be performed by a computing device to quickly identify a physical location of an item with enhanced precision, in accordance with one or more aspects of the present disclosure.

FIG. 3 is a flow diagram illustrating an example method that may be performed by a computing device to quickly identify a physical location of an item with enhanced precision. For example, the method illustrated in FIG. 3 may be performed by computing device 2 shown in FIGS. 1 and/or 2.

The method of FIG. 3 includes the following: receiving, by a mobile computing device, an item descriptor that describes one or more physical items (70); receiving, by the mobile computing device from a peripheral device using short-range wireless communication, a data payload comprising information usable to locate at least one of the one or more physical items (72); selecting, by the mobile computing device, physical location data based on the item descriptor and the data payload, wherein the physical location data includes a representation of a physical location of the at least one of the one or more physical items; (74) and outputting, from an output device of the mobile computing device, the physical location data that is usable to locate the at least one of the one or more physical items (76).

In some examples, the method includes, selecting, by the mobile computing device, a second item related to the at least one item according to at least one relationship criterion; responsive to selecting the second item, selecting, by the mobile computing device, second physical location data associated with the second item, wherein the second physical location data includes a representation of a second physical location of the second physical item; and outputting, from the output device of the mobile computing device, the physical location data of the second physical item.

In one example, the method includes determining, by the computing device, the at least one item has a contextual relationship with the second item; and selecting, by the computing device, the second item based at least on the contextual relationship with the at least one item. In some examples, the method includes determining, by the mobile computing device, that the physical location data is not available based on the item descriptor and the data payload; selecting, by the mobile computing device, a related item descriptor based on the data payload and the item descriptor; and outputting, by the mobile computing device, the related item descriptor.

In some examples, the method includes generating, by the mobile computing device, an item description comprising information that describes a product or service based on the data payload and the item descriptor; and responsive to generating the advertisement, outputting, from the output device of the mobile computing device, the advertisement with the physical location data. In some examples, the method includes receiving, by the mobile computing device, physical position data that indicates a direction that the mobile computing device is facing; comparing, by the mobile computing device, physical position data to information indicating a perspective of the peripheral device relative to the direction that the mobile computing device is facing, wherein the information is associated with the physical location data; and selecting, by the mobile computing device, the physical location data based on the information physical position data and the information indicating the perspective of the peripheral device relative to the direction that the mobile computing device is facing.

In some examples, the peripheral device comprises a Near Field Communication tag. In some examples, the method includes querying, by the mobile computing device, a repository that includes the physical location data based on the item descriptor and the data payload; and responsive to the query, receiving, by the mobile computing device, the physical location data. In some examples, the repository includes a database stored on the mobile computing device. In some examples, the method includes receiving, by the mobile computing device, a group of physical location data from a repository stored on a remote server, wherein the group of physical location data includes the physical location data; and storing, by the mobile computing device, the group of physical location data in the database.

In some examples, the method includes selecting, by the mobile computing device, the group of physical location data based on a physical location of the mobile computing device. In some examples, the repository includes a database stored on the remote server. In some examples, the method includes receiving, by the mobile computing device, an audio signal that describes one or more physical items; converting, by the mobile computing device, the audio signal to data that represents the one or more physical items; and determining, by the mobile computing device, that the item descriptor includes the data that represents the one or more physical items. In some examples, the physical item includes a physical object or physical location. In some examples, the physical location data further includes at least audio data or visual data.

In some examples, the data payload includes at least one or more spatial coordinates of the peripheral device or physical orientation data of the peripheral device, wherein the physical orientation data indicates a physical orientation of the peripheral device relative to the mobile computing device. In some examples, the data payload includes a unique identifier of the peripheral device. In some examples, the method includes determining, by the mobile computing device, a first physical orientation of the mobile computing device relative to a reference point; generating, by the mobile computing device, physical orientation data that indicates the first physical orientation of the mobile computing device; comparing, by the mobile computing device, the physical orientation data to information associated with the physical location data indicating a second physical orientation; selecting, by the mobile computing device, the physical location data based on the information associated with the physical location data indicating the second physical orientation.

Figure 4:
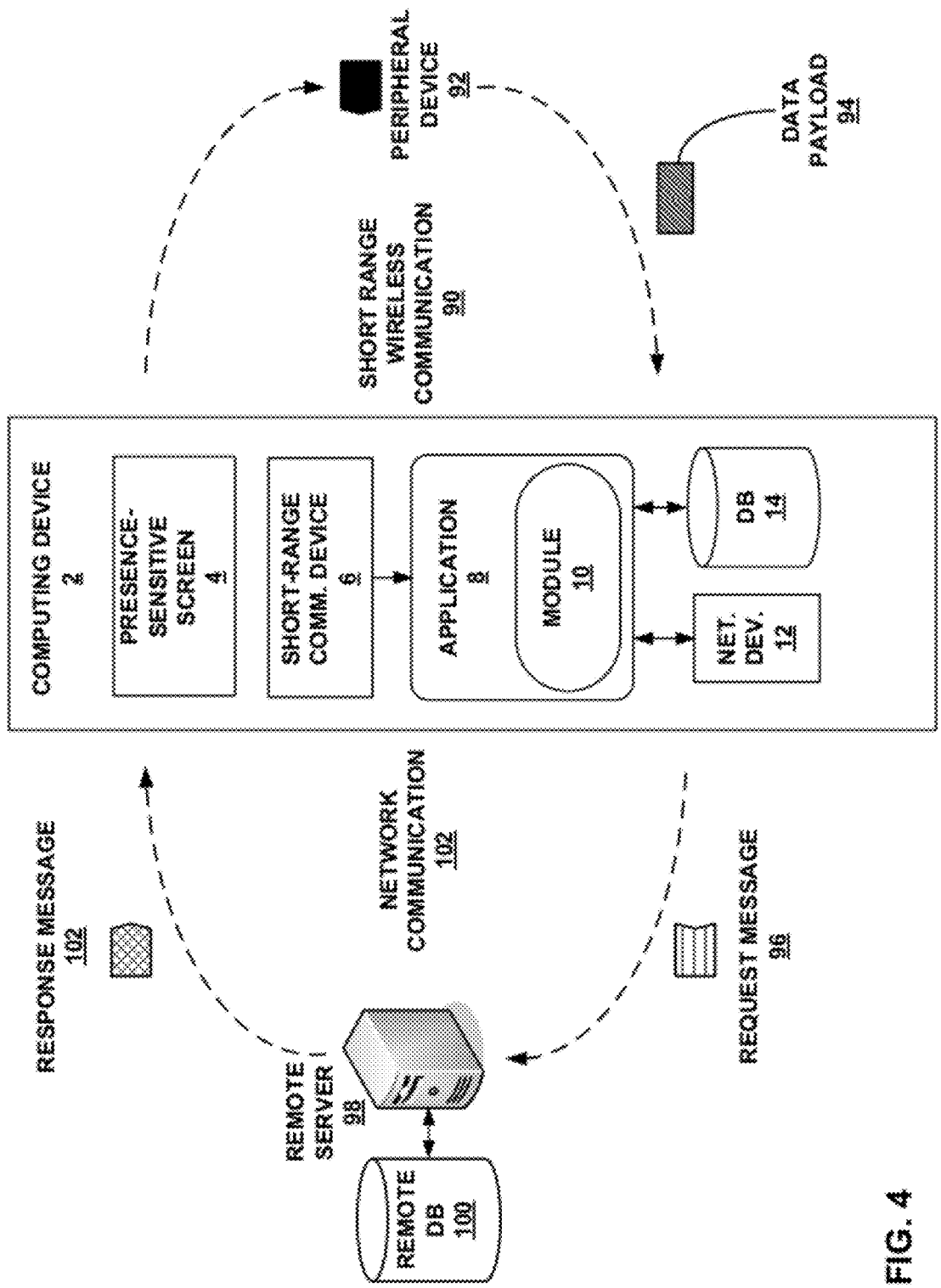
FIG. 4 is a diagram illustrating an example of a computing device that may be configured to communicate with a remote server, in accordance with one or more aspects of the present disclosure.

FIG. 4 is a diagram illustrating an example of a computing device 2 that may be configured to communicate with a remote server 98, in accordance with one or more aspects of the present disclosure. As shown in FIG. 4, computing device 2 and the various components included in FIG. 4 may include similar properties and characteristics as described in FIGS. 1 and 2. In some examples, computing device 2 may receive data payload 94 from peripheral device 92. In one example, application 8 may determine that database 14 does not include physical location data associated with data payload 94 and an item descriptor. In such examples, application 8 may use network device 12 of computing device 2 to request physical location data from remote server 98 via network communication 102.

As shown in FIG. 4, computing device 2 may include a network device 12. Network device 12 may be a network interface as described with respect to FIG. 2. In some examples, network device 12 may be a network interface card, such as an Ethernet card, an optical transceiver, a radio frequency transceiver, or any other type of device that can send and receive information.

In some examples, network device 12 may send data to a remote server 98. In FIG. 1, a remote server 98 may include one or more desktop computers, mainframes, minicomputers, or other computing devices capable of executing computer instructions and storing data, e.g., physical location data. Remote server 98 may connect to computing device 2 using a wireless or wired network.

In some examples, computing device 2 may be in proximity to peripheral device 92. Using the techniques described herein, computing device 2, may in one example receive data payload 94 using short-range communication device 6. In one example, application 8 may query database 14 to select physical location data based on data payload 94 and an item descriptor.

In some examples, application 8 may determine that no physical location data exists based on data payload 94 and the item descriptor. In such examples, application 8 may generate a lookup request. A lookup request, in some examples, may include a request for physical location data. In some examples, a lookup request may include data of data payload 94. In some examples, a lookup request may include an item descriptor. Request message 96, in one example, may include a lookup request. Request message 96, in some examples, includes hardware and software specifications relating to computing device 2 that remote server 98 may use to generate physical location data in a format displayable by computing device 2.

In some examples, application 8 may send request message 96 to remote server 98 using network device 12. In one example, data payload 94 may include a Uniform Resource Locator (URL) that indicates a location of remote server 98. In such examples, module 10 may use the URL to address the request message to remote server 98. In other examples, the network location of remote server 98 may be known to module 10. Consequently, module 10 may address request message 96 to remote server 98 using the known network location. In some examples, remote server 98 may be a centralized server that includes physical location data.

In other examples remote server 98 may provide an indexing or directory service. In such examples, remote server 98 may direct request message 96 to other appropriate remote servers that include physical location data based on information included request message 96. For example, remote server 98 may identify a unique identifier included in request message 96 that is associated with peripheral device 92. Remote server 98 may include an index that includes mappings of unique identifiers and network locations of remote servers that include physical location data associated with the unique identifiers. Using the index, remote server 98 may identify a second remote server that includes physical location data associated with the unique identifier. Consequently, remote server 98 may address and send request message 96 to the second remote server that includes the physical location data.

In one example, remote server 98 receives request message 96 via network communication 102 from computing device 2. Remote server 98 includes or may be connected to one or more remote databases 100. For example, remote database 100 may include Relational Database Management System (RDBMS) software. In one example, remote database 100 may be a relational database and accessed using a Structured Query Language (SQL) interface that is well known in the art. Remote database 100 may alternatively be stored on a separate networked computing device and accessed by remote server 98 through a network interface or system bus. Remote database 100 may in other examples be an Object Database Management System (ODBMS), Online Analytical Processing (OLAP) database or other suitable data management system.

In some examples, remote server 98 processes the contents of request message 96. In one example, remote database 100 includes associations that enable remote server 98 to identify physical location data based on data included in request message 96. Thus, in one example, remote server 98, upon receiving request message 96, may query remote database 100 to identify physical location data based on data included in request message 96. Upon selecting physical location data, remote server 98 may generate a response message 102 that contains the selected physical location data. In some examples, response message 102 may include additional data that may be associated with the physical location data. Remote server 98 may send response message 102 to computing device 2 via network communication 102.

In one example, computing device 2 may receive response message 102 from remote server 98 via network device 12. In some examples, application 8 may select physical location data from response message 102. Application 8, in one example, may output the physical location data to locate a physical item.

Figure 5:
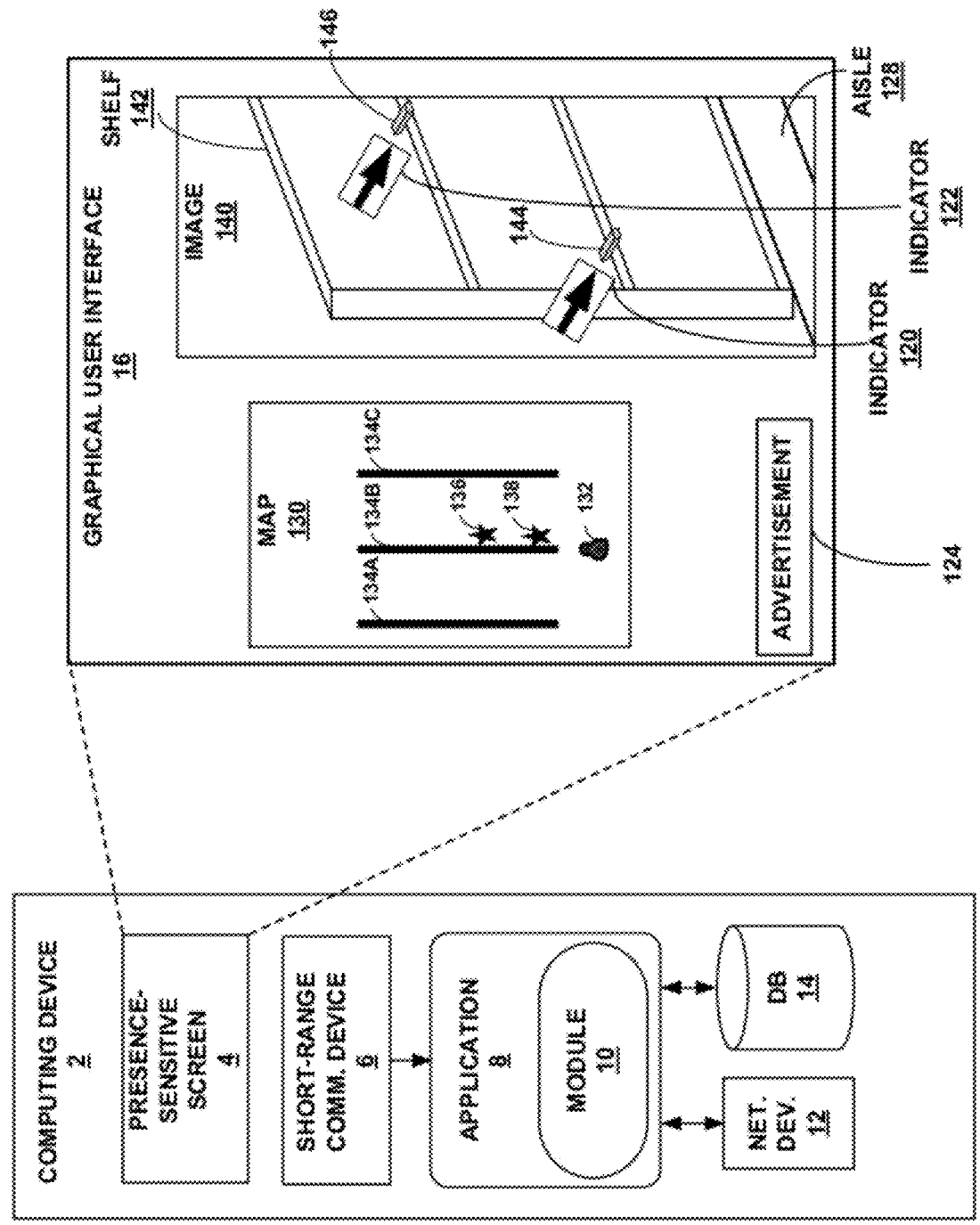
FIG. 5 is a diagram illustrating an example of a computing device that may be configured to execute an application in accordance with one or more aspects of the present disclosure.

FIG. 5 is a diagram illustrating an example of a computing device 2 that may be configured to execute an application 8 in accordance with one or more aspects of the present disclosure. As shown in FIG. 5, computing device 2 and the various components included in FIG. 5 may include similar properties and characteristics as described in FIGS. 1 and 2.

As shown in FIG. 5, GUI 16 may in one example display physical location data, e.g., map 130 and image 140, in response to receiving a data payload from a peripheral device as described in FIGS. 1-4. For example, a peripheral device may be attached to a shelf 142 at the end of an aisle 128 as shown in image 140. In one example, a data payload received by computing device 2 from a peripheral device may include spatial coordinates that indicate a physical position of the peripheral device. Examples of spatial coordinates may include, e.g., a value representing a vertical distance from a reference point such as a floor to a position of the peripheral device attached to an aisle. Spatial coordinates may, more generally, in some examples include any data indicating a physical position of a peripheral device relative to a reference point. In other examples, spatial coordinates may include data indicating an absolute physical position of a peripheral device in a coordinate system.

In some examples, module 10 may generate physical position data that indicates a physical position of a peripheral device relative to computing device 2. In some examples, physical position data may include a three-dimensional vector that represents a position of computing device 2 relative to the peripheral device. Physical position data may indicate a direction computing device 2 is facing as computing device 2 communicates via short-range wireless communication with a peripheral device. By determining the direction that computing device 2 is facing relative to the peripheral device, module 10 may further determine the direction the user is facing. Upon determining the direction the user is facing, module 10 may select physical location data, e.g., an image, which displays a view from the perspective of the user.

In one example, a peripheral device may be attached to shelf 142 at an end of 128. Upon scanning the peripheral device with computing device 2, module 10 may generate physical position data. The physical position data may indicate a direction that computing device 2 is facing relative to the peripheral device. Database 14 of computing device 2 may further include multiple photographs of the 128. Each photograph may display aisle 128 from a different perspective. Each photograph may further be assigned three-dimensional vector information indicating the perspective of the photograph relative to the peripheral device and/or direction that computing device 2 is facing relative to the peripheral device. Module 10 may compare the physical position data received from the peripheral device to the three-dimensional vector information of each photo to select a select a photograph of aisle 128 and shelf 142 that indicates a view of aisle 128 from the perspective of the user 34.

In some examples, computing device 2 may include an accelerometer or gyroscope that generates physical orientation data. Module 10 may use the physical orientation data to determine a physical orientation of computing device 2 relative to a reference point. A physical orientation of computing device 2 may include a vertical orientation wherein presence-sensitive screen 4 is oriented approximately perpendicular to a reference point, e.g., a surface on which the user stands. Another physical orientation of computing device 2 may include a horizontal orientation wherein presence-sensitive screen 4 is oriented approximately parallel to a surface on which the user stands. Module 10 may select different physical location data from database 14 based on the physical orientation of computing device 2. For instance, the physical orientation data, e.g., maps or images, stored on computing device 2 may each be associated with information specifying a physical orientation of computing device 2. Information may specify a horizontal physical orientation and a vertical physical orientation. An image may be associated with information indicating a vertical physical orientation while a map may be associated with information indicating a horizontal orientation of computing device 2.

In one example, a user may initially search for item 144 located on shelf 142. Module 10 may determine computing device 2 is positioned in a horizontal orientation, e.g., the user is holding computing device 2 flat in his/her hand. Consequently, module 10 may select and display physical location data comprising map 130 that further indicates the location of the item searched for by the user. Module 10 may select the physical location data by comparing the physical orientation data of the computing device and information specifying a physical orientation associated with the physical location data, e.g., map 130. If the physical orientation associated with map 130 matches the physical orientation of the computing device, map 130 is selected for display. If the user later changes the physical orientation of computing device 2 to a vertical orientation, e.g., the user holds computing device 2 upright, module 10 may select image 140 that displays shelf 142 and item 144. In this way, module 10 may use physical orientation data to display different physical location data based on the physical orientation of computing device 2.

In another example, database 14 may include information to generate a map 130 based on physical orientation data received in a data payload and/or generated by computing device 2. When scanning a peripheral device at a first end of a shelf, computing device 2 may generate map 130 indicating shelf 142 represented by shelf indicator 134B from the perspective of the user at the first end of shelf 142. For example, user indicator 132 may indicate on map 130 the current location of user 24. Moreover, map 130 may include map item indicators 136, 138 that correspond to physical locations of items sought by the user in shelf 142. Map 130 may further indicate shelves represented by shelf indicators 134A, 134C. In a different example, computing device 2 may generate a map from the perspective of the user at a second, different end of the shelf when the user scans a peripheral device at the second end of the shelf. In this way, physical orientation data may be used by module 10 to select physical orientation data that is more useful to user 34.

GUI 16 may in some examples include physical item indicators 120, 122. In some examples, physical location data may include physical item indicators. Physical item indicators 120, 122 may in some examples indicate to a user the physical location of one or more physical items. For example, a user may initially search for a first item 146, which happens to be located in aisle 128 as shown in FIG. 5. Using techniques described in FIGS. 1-4, application 8 may display photograph 130 of aisle 128. Application 8 may further include item indicator 122 that indicates a physical location of first item 146. In this way, the user may quickly determine the physical location of first item 146.

In some examples, module 10 may generate a route between one or more physical item indicators based on group of item descriptors provided by a user. For example, a user may enter a group of item descriptors into application 8 that correspond to items he/she wishes to obtain at a store. Upon arriving at the store, the user may scan a peripheral device using computing device 2. Using the data payload received from the peripheral device and the item descriptors, module 10 may select physical location data, e.g., a map, for one or more of the items. Module 10 may further include physical item indicators that indicate physical locations of at least one of the one or more items included in the map. In one example, module 10 may include physical location indicators in the map for each of the items searched for by the user. Module 10 may, in some examples, include different visual representations such as color and shape for different items. For instance, a first color and shape representation may represent substitute items. A second color and shape representation different from the first representation may represent complement items. A third color and shape representation may represent an ordering or priority of each item as specified by the user. More generally, different visual representations may be used to represent different relationships between items or differences between individual items. Module 10 may in some examples further determine and display a route between items. The route may specify a shortest distance or quickest route, which may be defined in some examples by a user preference.

In some examples, module 10 may perform a selection operation that selects a second item 144 related to the first item based on one or more relationship criteria. A relationship criterion may be any association between a first item and a second item. Relationship criteria may be stored in database 14 or remote database 100 as shown in FIG. 4. In some examples, relationship criteria may include pre-defined associations generated by a user of computing device 2, other person, or other computing device. In other examples, relationship criteria may be dynamically generated by module 10 using one or more algorithms, e.g., learning algorithms based on reinforcement learning or transduction, in response to data received by computing device 2 from a remote server, or data or use patterns of a user.

In any case, module 10, responsive to selecting the second item, may determine a search operation as described in FIGS. 1-4 to select physical location data of the second item. Application 10 may cause presence-sensitive screen 4 to display the physical location data of the second physical item. For example, module 10 may determine the first item is a brand-name food item may further determine that the second item is an alternative item, such as a corresponding generic food item. Module 10 may thus, output item indicator 120 to indicate a physical location of the brand-name food item, and may further output item indicator 122 to indicate a physical location of the generic food item.

In some examples, application 10 may select a group of items that are related to the first item 146 rather than a single item. In such examples, application 10 may cause presence-sensitive screen 4 to display the group of related items as selectable items to the user. For example, a user may initially cause application 10 to perform a search for aspirin. In response module 10 may provide a group of choices for other analgesics, bandages, cold medicines, juice beverages, thermometers that may each be related to aspirin, e.g., as products related to illness.

In some examples, application 10 may include contextual relationships between an item descriptor and one or more candidate items stored in database 14. For instance, a contextual relationship may be an association between a product, e.g., aspirin, and a problem or theme, e.g., pain or illness. In the example of aspirin, a customer may search for aspirin because he/she is ill. Contextual relationships defined in database 14 may associate aspirin with illness, and illness may further be associated with candidate items such as bandages or cold medicines. The contextual relationships may be stored in database 14. Thus, a user may enter text that specifies a problem/theme or alternatively an item descriptor and application 10 may select one or more items that have contextual relationships to the input provided by the user. Application 10 may select physical location data for each of the one or more items that have context relationships to the input provided by the user.

The user may provide user input to select one or more of the items in the group of related items. Using the user input, application 10 may select physical location data and/or items indicators associated with each of the selected items that presence-sensitive screen 4 may display to the user. In this way, module 10 may display one or more item indicators according to at least one relationship criteria.

In some examples, a relationship criterion may indicate a physical distance between a first item and a second item. Thus, in one example, module 10 may determine a close physical distance exists between a first item and a second item. Furthermore, the first and second items may often be purchased together. The physical distance information may be stored in database 14 as relationship criteria of the first and second items. Module 10 may use the relationship criteria to display an item indicator for each item to the user, which may enable a user to conveniently select both the first item and the second item.

In some examples, a relationship criterion may indicate a substitute relationship between a first item and a second item. A substitute relationship may indicate a first price of the first item and a second price of the second item are positively correlated. Thus, when the first price increases, the second price may also increase. For example, a relationship criterion may indicate a generic food item is a substitute for a brand-name food item. A relationship criterion between substitutes, e.g., the generic food item and the brand-name food item, may be stored in database 14. When a user searches for the food item, module 10 may select physical location data that includes the locations of the generic food item and the brand-name food item. Module 10 may further display item indicators for both the generic and brand-name items to notify the user of the cheaper, generic substitute and the brand-name food item.

In some examples, the user may further provide settings in module 10 that indicate user preferences. In such examples, module 10 may select items based on relationship criteria stored in database 14 and the preferences set by the user. For instance, a preference may be set by a user to save money. In such examples, module 10 may select and display physical location data for cheaper substitute goods in addition to the original item searched for by the user. Module 10 could further allow the user to more granularly define preferences to save money. For instance, the user may indicate a money saving preference for one item type but not for others, e.g., bread versus cereal. A granular money saving preference may also be specified for one product group but not another, e.g., food versus toiletries. In other examples, the user could provide a setting in module 10 to prefer band-name items. For instance, relationship criteria in database 14 may indicate one or more items that are associated with a particular brand-name, or in other examples, indicate that the item is simply brand name. In each case, module 10 may select items from database 14 that are specified by relationship criteria matching the settings provided by the user.

In some examples, a relationship criterion may indicate a complementary relationship between a first item and a second item. A complement relationship may indicate a first price of the first item and a second price of the second item are inversely (e.g., negatively) correlated. Thus, when the first price increases, the second price may decrease. For instance, two products may be consumed together, e.g., coffee and creamer. In some examples, it may be more likely that a user wishes to purchase the complement product with the product the user initially seeks. In one example, when a user searches for coffee, module 10 may search database 14 for items that have a complement relationship with coffee. The complement relationship may be stored as a relationship criterion in database 14. Using the complement relationship, module 10 may select physical location data for both creamer and coffee because it is defined as having a complement relationship to coffee. Module 10 may further generate item indicators to indicate the location of both the coffee and the creamer.

In some examples, module 10 may generate one or more advertisements based on a data payload and an item descriptor. In one example, an advertisement may be an item description that includes information describing a product or service. Database 14 and/or remote database 100 as shown in FIG. 4, may include advertising data. Advertising data may be used to generate advertisements or may include selectable advertisements. Using the data payload and the item descriptor, module 10 may generate one or more related advertisement 124 that presence-sensitive screen 4 may display. In one example, the advertisement may be for the item initially searched for by the user. In another example, an advertisement may be related to a second item associated with the desired item based on a relationship criterion. For example, application 8 may generate an advertisement for a generic item of lower cost when the user initially seeks a corresponding brand-name item. In some examples, an advertisement may be a coupon. In still other examples, the application 8 may only generate the coupon in response to determining that computing device 2 has communicated with a peripheral device.

In some examples, module 10 may determine that physical location data is not available in, e.g., database 14, based on an item descriptor and data payload. For example, a user may initially misspell an item descriptor when entering it into computing device 2. In some examples, a user may mistype the item descriptor. In other examples, an audio-to-text operation may produce a result not intended by the user through his/her speech. In such examples, module 10 may determine a match operation that selects a related item descriptor based on the data payload and the item descriptor provided by the user. For example, module 10 may determine, based on information included in a data payload, that computing device 2 communicated with a peripheral device located near a pharmacy aisle.

In the current example, the item descriptor entered by the user may include the text "asppirn" that the user intended as "aspirin." Module 10 may determine the user intended the spelling of "aspirin" based on the character, phonetic, and/or dictionary similarities of "asppirn" to "aspirin" and the data payload indicating the pharmacy aisle. Thus, in the current example, module 10 may use the information indicating the pharmacy aisle to assist the user in identifying the user's intended item descriptor. In some examples, the related item descriptor selected or generated by module 10 may be provided to the user for selection as the intended item descriptor. In this way, user errors or other inaccuracies may be corrected by module 10 using enhanced precision location information.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

The invention claimed is:

1. A method comprising:
    receiving, by a mobile computing device, an item descriptor that describes one or more physical items;
    receiving, by the mobile computing device, from a communication tag using short-range wireless communication, a data payload comprising information usable to locate at least one of the one or more physical items;
    comparing, by the mobile computing device, physical position data that indicates a direction that the mobile computing device is currently facing to information indicating a perspective of the communication tag relative to the direction;
    selecting, by the mobile computing device, physical location data based on the item descriptor, the data payload received by the mobile computing device from the wireless communication tag, and the comparing of physical position data to information indicating the perspective of the communication tag, wherein the physical location data includes a representation of a physical location of the at least one of the one or more physical items; and
    outputting, by the mobile computing device and based at least in part on the selected physical location data, the representation of the physical location of the at least one of the one or more physical items.

2. The method of claim 1, further comprising:
    selecting, by the mobile computing device, a second item related to the at least one of the one or more physical items according to at least one relationship criterion;
    responsive to selecting the second item, selecting, by the mobile computing device, second physical location data associated with the second item, wherein the second physical location data includes a representation of a second physical location of the second item; and outputting, by the mobile computing device, the second physical location data of the second item.

3. The method of claim 2, further comprising:
    determining, by the mobile computing device, that the at least one item has a contextual relationship with the second item; and
    selecting, by the mobile computing device, the second item based at least on the contextual relationship with the at least one item.

4. The method of claim 1, further comprising:
    determining, by the mobile computing device, that the physical location data is not available based on the item descriptor and the data payload;
    selecting, by the mobile computing device, a related item descriptor based on the data payload and the item descriptor; and
    outputting, by the mobile computing device, the related item descriptor.

5. The method of claim 1, further comprising:
    generating, by the mobile computing device, an item description comprising information that describes a product or service based on the data payload and the item descriptor; and
    responsive to the generating, outputting, by the mobile computing device, an advertisement with the physical location data.

6. The method of claim 1, wherein the communication tag comprises a Near Field Communication tag.

7. The method of claim 1, wherein selecting the physical location data based on the item descriptor and the data payload further comprises:
    querying, by the mobile computing device, a repository that includes the physical location data based on the item descriptor and the data payload; and
    responsive to the query, receiving, by the mobile computing device, the physical location data.

8. The method of claim 7, wherein the repository comprises a database stored on the mobile computing device.

9. The method of claim 8, further comprising:
receiving, by the mobile computing device, a group of physical location data from a repository stored on a remote server, wherein the group of physical location data includes the physical location data; and
storing, by the mobile computing device, the group of physical location data in the database.

10. The method of claim 9, further comprising:
selecting, by the mobile computing device, the group of physical location data based on a physical location of the mobile computing device.

11. The method of claim 9, wherein the repository comprises a database stored on the remote server.

12. The method of claim 1, wherein receiving the item descriptor that describes the one or more physical items further comprises:
receiving, by the mobile computing device, an audio signal that describes one or more physical items;
converting, by the mobile computing device, the audio signal to data that represents the one or more physical items; and
determining, by the mobile computing device, that the item descriptor includes the data that represents the one or more physical items.

13. The method of claim 1, wherein the physical item comprises a physical object or physical location.

14. The method of claim 1, wherein the physical location data further comprises at least audio data or visual data.

15. The method of claim 1, wherein the data payload comprises at least one or more spatial coordinates of the communication tag or physical orientation data of the communication tag, wherein the physical orientation data indicates a physical orientation of the communication tag relative to the mobile computing device.

16. The method of claim 1, wherein the data payload comprises a unique identifier of the communication tag.

17. The method of claim 1, further comprising:
determining, by the mobile computing device, a first physical orientation of the mobile computing device relative to a reference point;
generating, by the mobile computing device, physical orientation data that indicates the first physical orientation of the mobile computing device;
comparing, by the mobile computing device, the physical orientation data to information associated with the physical location data indicating a second physical orientation;
selecting, by the mobile computing device, the physical location data based on the information associated with the physical location data indicating the second physical orientation.

18. A non-transitory computer-readable storage medium encoded with instructions that, when executed, cause one or more processors of a mobile computing device to perform operations comprising:
receiving, an item descriptor that describes one or more physical items;
receiving, from a communication tag using short-range wireless communication, a data payload comprising information usable to locate at least one of the one or more physical items;
comparing, physical position data that indicates a direction that the mobile computing device is currently facing to information indicating a perspective of the communication tag relative to the direction;
selecting physical location data based on the item descriptor, the data payload received by the mobile computing device from the wireless communication tag, and the comparing of physical position data to information indicating the perspective of the communication tag, wherein the physical location data includes a representation of a physical location of the at least one of the one or more physical items; and outputting, based at least in part on the selected physical location data, the representation of the physical location of the at least one of the one or more physical items.

19. A computing device, comprising:
an input device to receive an item descriptor that describes one or more physical items;
a short-range communication device to receive a data payload from a communication tag using short-range wireless communication comprising information usable to locate at least one of the one or more physical items;
one or more processors configured to:
compare physical position data that indicates a direction that mobile computing device is currently facing to information indicating a perspective of the communication tag relative to the direction;
select physical location data based on the item descriptor, the data payload received by the mobile computing device from the wireless communication tag, and the comparing of physical position data to information indicating the perspective of the communication tag, wherein the physical location data includes a representation of a physical location of the at least one of the one or more physical items; and
an output device to output, based at least in part on the selected physical location data, the representation of the physical location of the at least one of the one or more physical items.

20. The method of claim 1, wherein outputting the physical location data that is usable to locate the at least one of the one or more physical items further comprises outputting the physical location data as a view from a perspective of a user.

* * * * *